No. 762,834. Patented June 14, 1904.

UNITED STATES PATENT OFFICE.

GEORGES R. DE MONTLORD, OF NEW YORK, N. Y.

SOLUTION FOR TREATING TEXTILE FIBERS.

SPECIFICATION forming part of Letters Patent No. 762,834, dated June 14, 1904.

Application filed October 24, 1903. Serial No. 178,443. (No specimens.)

*To all whom it may concern:*

Be it known that I, GEORGES R. DE MONTLORD, a citizen of the United States of America, residing at New York, county and State of New York, have invented certain new and useful Improvements in Solutions for Treating Textile Fibers; and I do hereby declare that the following is a full, clear, and exact description of the invention, such as will enable others skilled in the art to which it appertains to make and use the same.

My invention relates to the treatment of flax, china-grass, hemp, and other textile plants or products; and my object is to produce a bath which is especially adapted for improving the quality and texture of the fiber of flax and removing gummy substances after the woody material or boon has been substantially removed from the same by the processes known as "breaking" or "scutching."

The composition of this bath is as follows: ten liters of barley-meal, twenty liters of sweet-almond meal, thirty liters of linseed-meal, ten liters of castor-bean meal, twenty liters of olive-oil, ten liters of oxygenized water, one five-hundredth of a liter of sulfuric acid. These ingredients are thoroughly incorporated together and are then dissolved in two thousand liters of distilled water. The fibers of flax, china-grass, &c., to be treated are placed in the resulting solution and allowed to boil therein for the period of substantially a half hour. The fiber is then removed and thoroughly rinsed, after which it is allowed to dry before being combed.

It is found that flax, china-grass, &c., which has been treated with the solution described above is of a very fine quality and texture and being consequently much increased in value.

While I have stated the exact quantities which I prefer to use in mixing the ingredients to form this solution, it should be understood that the quantities stated simply represent substantially the proper proportions of the ingredients, and I do not wish to limit myself to the exact quantities given.

Having described my invention, what I claim, and desire to secure by Letters Patent, is—

A composition composed of barley-meal, sweet-almond meal, linseed-meal, and castor-bean meal, olive-oil, oxygenized water, sulfuric acid, and water.

In witness whereof I have hereunto set my hand in the presence of two witnesses.

GEORGES R. DE MONTLORD.

Witnesses:
T. MYNARD,
M. MCALEER.